(12) United States Patent
Noda et al.

(10) Patent No.: US 6,186,484 B1
(45) Date of Patent: Feb. 13, 2001

(54) ELASTOMER DAMPER FOR AN ACTUATOR CYLINDER

(75) Inventors: Mitsuo Noda, Ichinomiya; Akiyoshi Horikawa, Kodaira, both of (JP)

(73) Assignee: Howa Machinery, Ltd., Nagoya (JP)

( * ) Notice: Under 35 U.S.C. 154(b), the term of this patent shall be extended for 0 days.

(21) Appl. No.: 09/196,233

(22) Filed: Nov. 20, 1998

(30) Foreign Application Priority Data

Nov. 24, 1997 (JP) .................................................. 9-339296

(51) Int. Cl.⁷ ...................................................... F16M 1/00
(52) U.S. Cl. .............................. 267/136; 267/139; 92/88; 92/85 R
(58) Field of Search ................................... 267/292, 136, 267/137, 139, 140, 141, 154; 92/88, 143, 85 R (56) References Cited

U.S. PATENT DOCUMENTS

| | | | |
|---|---|---|---|
| 3,496,840 | 2/1970 | Wandel et al. | 92/85 |
| 3,805,672 | 4/1974 | Pekrul | 91/396 |
| 3,961,564 | 6/1976 | Rich et al. | 92/85 |
| 4,137,827 | * 2/1979 | Hewitt | 92/24 |
| 4,647,025 | * 3/1987 | Gold | 267/64.27 |
| 5,606,903 | * 3/1997 | Drittel | 92/88 |

FOREIGN PATENT DOCUMENTS

| | | |
|---|---|---|
| 63-190909 | 8/1988 | (JP) . |
| 64-6505 | 1/1989 | (JP) . |
| 1-113603 | 7/1989 | (JP) . |
| 3-69303 | 7/1991 | (JP) . |
| 5-59053 | 8/1993 | (JP) . |

* cited by examiner

Primary Examiner—Robert J. Oberleitner
Assistant Examiner—Mariano Sy
(74) Attorney, Agent, or Firm—Finnegan, Henderson, Farabow, Garrett & Dunner, L.L.P.

(57) ABSTRACT

The elastomer dampers are disposed at both ends of the actuator cylinder in order to stop the piston moving in the cylinder at its stroke ends. The elastomer damper includes a pair of the protruding portions which abut the piston at its stroke end. The protruding portion has an tapered shape in which the cross sectional area thereof gradually decreases from the base to the top. Therefore, when the piston abuts the protruding portions and compresses the protruding portions, the braking force exerting on the piston gradually increases without sudden change. Therefore, the piston decelerates smoothly at its stroke ends. Further, since the top surface of the protruding portion is formed as a flat plane and the top surface is connected to the tapered side surface of the protruding portion by a round surface, no stress concentration occurs at this portion. Therefore, cracks or breakage of the material do not occur in the top surface even after a long operating time of the actuating cylinder.

13 Claims, 6 Drawing Sheets

ELASTOMER DAMPER FOR AN ACTUATOR CYLINDER

BACKGROUND OF THE INVENTION

1. Field of the Invention

The present invention relates to an elastomer damper for abutting against a piston sliding in the bore of an actuator cylinder at its stroke end in order to absorb mechanical shock caused at the stroke end of the piston.

2. Description of the Related Art

An elastomer damper of this type is disclosed, for example, in Japanese Unexamined Patent Publication (Kokai) No. 1-6505. In the elastomer damper in the '505 publication a damper member made of an elastomer is disposed in the actuator cylinder by attaching it to an end cap closing the end opening of the cylinder. More specifically, the damper member in the '505 publication has a cylindrical shape and has stepped diameter portions, i.e., a large diameter base and a smaller diameter tip portion. A recess for receiving the base of the damper member is formed on the inner end face of the end cap which faces inside of the cylinder. The damper member is fitted to the end cap by inserting the base of the damper member into the recess of the end cap. The recess has a diameter larger than that of the base so that, when the damper member is attached to the end cap, a clearance is formed between the outer periphery of the base and the wall of the recess. In order to fix the damper member in the recess, a fixing cap is fitted to the inner end face of the end cap. When the damper member is fitted to the end cap, the bottom face of the damper member firmly contacts the bottom of the recess and, in this condition, the tip of the damper member protrudes from the inner end face of the end cap in the direction toward the piston in the cylinder. A part of the tip portion of the damper member which protrudes from the inner end face of the end cap is tapered so that the diameter of this portion decreases in the direction toward the piston (i.e., in the direction towards the center of the length of the cylinder).

A groove for receiving a sealing member (such as an O-ring) preventing the leakage of the working fluid in the cylinder is defined by the fixing cap and the inner end face of the end cap. Further, the working fluid is supplied to and discharged from the cylinder through a fluid passage opening on the bottom surface of the recess of the end cap.

In the elastomer damper of the '505 publication, the damper member is compressed when the piston moving in the cylinder hits the damper member at its stroke end and, when it is compressed, the damper member expands in the radial direction in order to absorb the kinetic energy of the piston. However, since the damper member in the '505 publication consists of two portions, tip and base, having different diameters, this step wise change in the diameter causes a sudden change in the elasticity of the damper member when it is compressed by the piston. This sudden change in the elasticity causes a sudden change in the braking force exerting on the piston and hampers the smooth deceleration of the piston.

Further, the elastomer damper in the '505 publication requires the fixing cap in order to attach the damper member to the end cap and to form the receiving groove for O-ring. Since a separate element (i.e., the fixing cap) is required for fitting the elastomer damper and the O-ring, the number of the elements required for constructing the actuator increases.

Moreover, in the elastomer damper in the '505 publication, the top surface of the damper member which contacts the piston is formed as a flat plane and a sharp ridge is formed at the periphery of the top surface where the top surface meets the tapered side surface of the damper member. When the piston hits the top surface of the damper member, a stress concentration occurs at the ridge of the top surface. Therefore, after a long operating time, the ridge of the top surface tends to crack during the operation, and when a crack occurs at the ridge, it tends to extend toward the center of the top surface. This may cause a deterioration of the damping capability of the elastomer damper.

Further, the elastomer damper in the '505 publication is formed as a solid cylindrical body. Therefore, when the damper members compressed by the piston the damper member can expand only toward the outward radial direction. Thus, when a damper member having a large diameter is required, the amount of expansion in the radial direction becomes considerably large. In this case, a large clearance is required around the outer periphery of the damper member to accommodate the large amount of the radial expansion of the damper member. However, in a practical standpoint, it is not preferable to provide such a large clearance around the damper.

SUMMARY OF THE INVENTION

In view of the problems in the related art as set forth above, one of the objects of the present invention is to provide an elastomer damper capable of decelerating the moving piston in a continuous smooth manner.

Another object of the present invention is to provide an elastomer damper having a long-term durability against cracking and breakage of the material of the damper.

Further, one more object of the present invention is to provide an elastomer damper which can be attached to the cylinder without increasing the number of elements used in the cylinder.

One or more of the objects as set forth above is achieved by an elastomer damper for receiving a piston sliding in a cylinder of an actuator cylinder at the stroke end thereof comprising a base portion fixed to an end cap attached to an end of the cylinder, wherein the base portion is disposed in the cylinder and has an inner end facing the piston in the cylinder and an outer end attached to the end cap, a protruding portion projecting from the base portion beyond the inner end in the direction toward the piston in the cylinder wherein the protruding portion has a tapered shape having a cross sectional area perpendicular to the longitudinal axis thereof gradually decreasing from the portion where it merges the outer end in the direction toward the piston and wherein the protruding portion is disposed in the cylinder in such a manner that a clearance is provided around the periphery of the protruding portion in order to allow the protruding portion to expand in the direction perpendicular to the longitudinal axis thereof when the piston abuts the protruding portion at the stroke end.

According to the present invention, since the cross sectional area of the protruding portion gradually decreases, i.e., since no stepped diameter portion exists in the protruded portion, the braking force exerted on the piston when it hits the protruding portion continuously increases. Therefore, the piston decelerates continuously in a smooth manner.

According to another aspect of the present invention, there is provided an elastomer damper for receiving a piston sliding in a cylinder of an actuator cylinder at the stroke end thereof comprising a base portion fixed to an end cap attached to an end of the cylinder, wherein the end cap comprises an inserting portion which is inserted into the bore of the cylinder when the end cap is attached thereto, and wherein a recess for receiving an outer end of the base portion of the elastomer damper when the damper is attached to the end cap is formed on an end of the inserting portion, and a plurality of protruding portions projecting from the outer end of the base portion in the direction toward the piston in the cylinder, wherein the protruding portions have tapered shapes having cross sectional areas perpendicular to the longitudinal axes thereof gradually decreasing in the direction from the outer end toward the piston and, wherein the base portion comprises a flange portion formed generally perpendicular to the longitudinal axis of the projecting portions and being connected to the outer end by a connecting portion formed on the outer end between the protruding portions, and wherein the flange portion is disposed in such a manner that a receiving groove is formed between the flange portion and the inserting portion of the end cap for receiving a cylinder gasket for preventing the fluid in the bore of the cylinder from leaking to the outside of the cylinder, and wherein the protruding portions extend in the direction toward the piston through apertures formed on the flange portion.

According to this aspect of the invention, the base portion of the elastomer damper comprises a flange for defining the receiving groove of the cylinder gasket. The flange is connected integrally to the outer end of the base portion at the connecting portion. Therefore, no separate element is required for holding the cylinder gasket in place. Further, since the flange is connected to the outer end by the connecting portion between the protruding portions, no members other than the connection portion around the protruding portions are required for connecting the flange to the base portion. Therefore, the radial expansions of the protruding portions, when they are compressed, are not hampered.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENT

Hereinafter, embodiments of an elastomer damper according to the present invention will be explained with reference to FIGS. 1 through 10.

Figure 1:
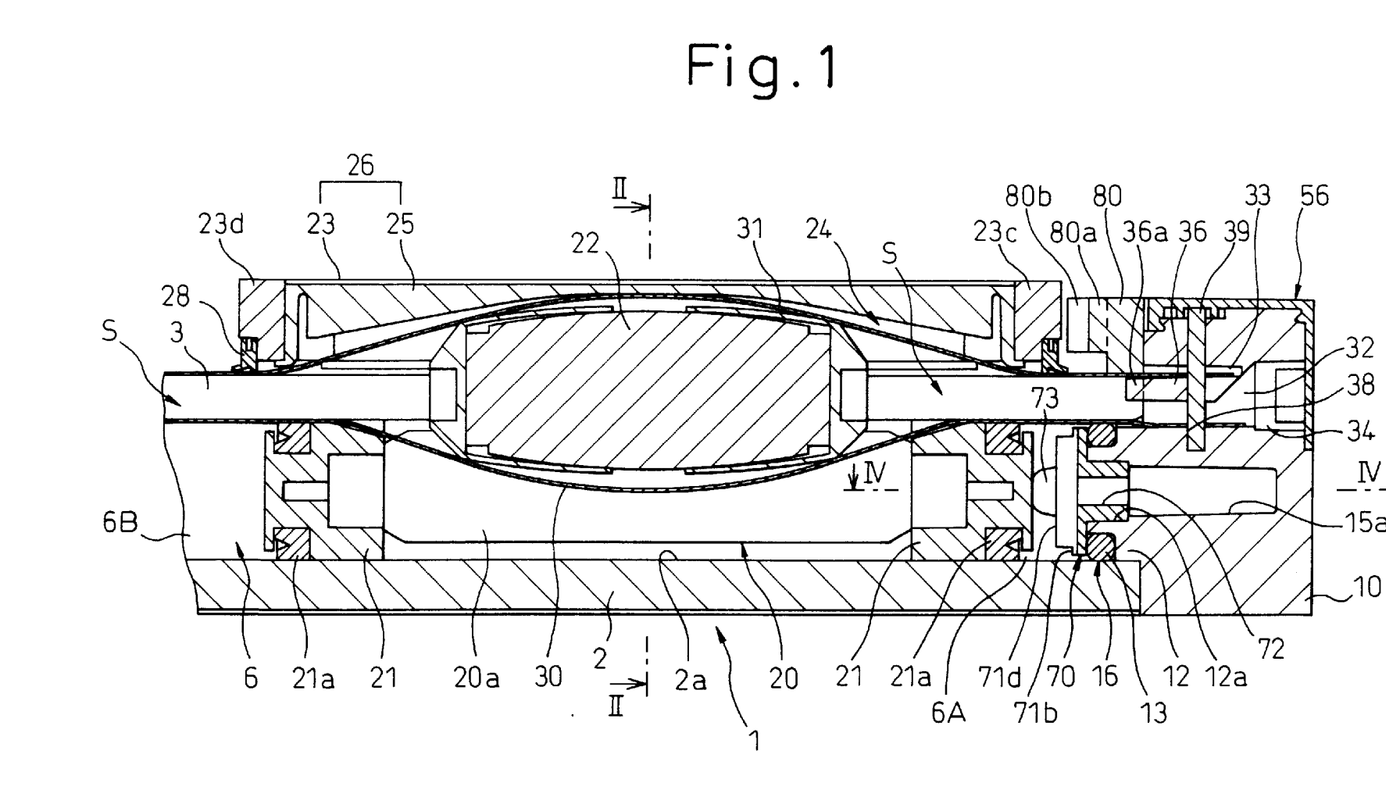
FIG. 1 is a longitudinal section view of a rodless power cylinder illustrating an embodiment of the elastomer damper of the present invention.
Figure 2:
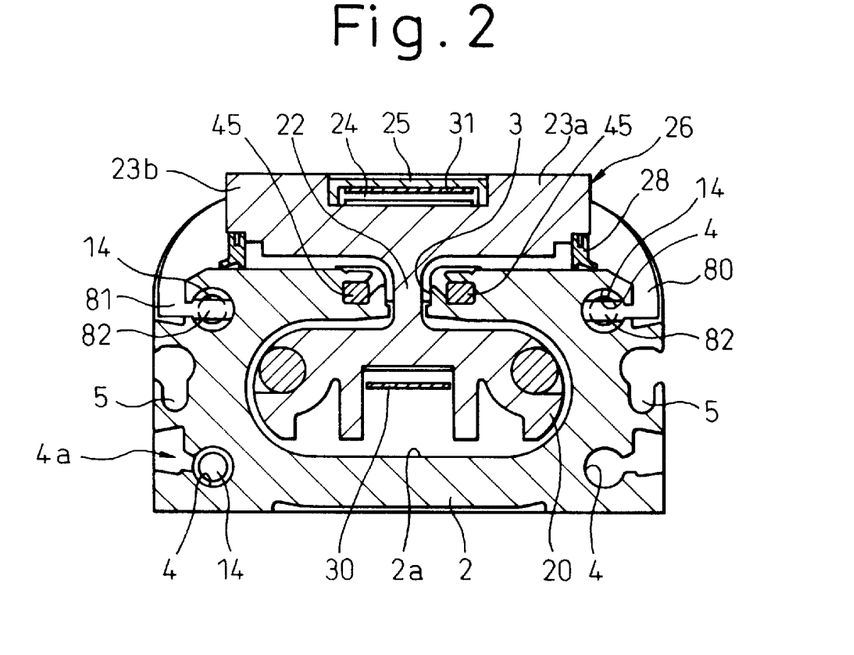
FIG. 2 is a cross sectional view taken along the line II—II in FIG. 1.

FIGS. 1 and 2 illustrate a rodless power cylinder type actuator cylinder 1 actuated by fluid (pneumatic) pressure. In FIG. 1, reference numeral 1 designates a rodless power cylinder. Numeral 2 is a tube (cylinder barrel) of the rodless power cylinder 1 which is made of non-magnetic metal such as aluminum alloy and formed by an extrusion or a drawing process. As shown in FIG. 2, the cylinder tube 2 has a non-circular (in this embodiment, an oblong circular) bore 2a. A slit opening 3 is formed on the side wall of the cylinder tube 2 along the entire length thereof. On the outer wall of the cylinder tube 2, grooves 4 for attaching end caps 10 to the tube 2 and grooves 5 for mounting attachments, such as sensors, are formed along the entire length of the cylinder tube 2. The groove 4 consists of an aperture 4a and the portion thereof inside the aperture 4a is circular in shape and has a diameter larger than the width of the aperture. Namely, the groove 4 is formed as a circular hole having a slit (the aperture) opening to the outer wall of the cylinder tube 2 (refer to FIG. 2).

Both ends of the cylinder tube 2 are closed by end members (end caps) 10 having a portion extending above the tube 2, and a cylinder chamber 6 is defined by the wall of the bore 2 and end caps 10 as shown in FIG. 1. The end cap 10 has an insert portion 12 which is inserted into the tube 2 with a cylinder gasket (O-ring) 13 intervening therebetween. When attaching the end cap 10 to the cylinder tube 2, the end cap 10 is aligned to the cylinder tube 2 by inserting the portion 12 into the bore 2a and a protuberance 36a of an intermediate wall portion 36 into the end of the slit 3. In this condition, the end cap 10 is secured to the end of the cylinder tube 2 by tightening self-tapping screws 14 into the ends of the grooves 4 (FIG. 2). A self-tapping screw is a screw which cuts a thread in the wall of a screw hole by itself when it is screwed into the screw hole. In this embodiment, the self-tapping screws 14 are manufactured, for example, in accordance with JIS (Japanese Industrial Standard) No. B-1122.

The cylinder chamber 6 is divided into a fore cylinder chamber 6A and an aft cylinder chamber 6B by an internal moving body (a piston) 20 having piston ends 21 on both sides (FIG. 1). The piston ends 21 are provided with piston packings 21a. On the piston 20, a coupling member (a piston yoke) 22 for driving an external carriage 26 through the slit 3 is formed integrally at the portion between the piston ends 21. At the end of the coupling member 22 outside of the cylinder tube 2, a piston mount 23 which acts as a base of the external carriage 26 is integrally formed. The piston mount 23 has a left and right side faces 23a, 23b and a fore and aft side faces 23c, 23d. On the upper face of the piston mount 23, a recess 24 extending from the fore side face 23c to the aft side face 23d is formed. A cover member 25 made of, for example, synthetic resin is provided for covering the aperture of the recess 24. The recess 24, covered by the cover member 25 defines a passage through which an outer seal band 31 passes, as shown in FIG. 1. The piston mount 23 and the cover member 25 constitute an external carriage 26. A scraper 28 is attached to the piston mount 23 around the lower periphery thereof in order to prevent the incursion of dust into the space between the cylinder tube 2 and the piston mount 23.

The end cap 10 in this embodiment is formed as a molded synthetic resin in order to reduce the weight and the manufacturing cost thereof. Recesses 32, 33 for inserting the ends of the outer seal band and the inner seal band, and an intermediate wall 36 between the recesses 32 and 33 are formed on the inside face of the end cap 10. The height of the recess 32 for the inner seal band 30 is much greater than the thickness of the inner seal band 30 so that the recess 32 communicates with a space S (FIG. 1) formed between the inner seal band 30 and the outer seal band 31. Reference numeral 38 in FIG. 1 is a pin hole which passes through the wall above the recess 33, the intermediate wall 36 and the wall below the recess 32.

The inner seal band 30 and the outer seal band 31 extend between end caps and pass the upper side and the lower side of the piston yoke 22, respectively. The inner seal band 30 covers the slit 3 from the inside of the cylinder tube 2, and the outer seal band 31 covers the slit from the outside of the cylinder tube 2. The inner seal band and the outer seal band in this embodiment are thin flexible bands made of, for example, a magnetic metal such as steel. The seal bands 30 and 31 have widths wider than the slit 3. Fitting holes are provided on the both ends of the seal bands 30 and 31 at the positions corresponding to the pin hole 38 of the end caps 10 when the seal bands are set in place.

The seal bands 30 and 31 are secured to the end caps 10 by inserting fitting pins 39 into the fitting holes from the outside of the end caps in such a manner that the pins 39 pass through the fitting holes of the seal bands. Further, a removable cap 56 covering the top of the pin 39 is attached to the end cap 10 in order to prevent the pin 39 from falling out from the end cap 10.

In this embodiment, magnets 45 are disposed on both sides of the slit 3 along the entire length thereof. Therefore, the seal bands 30 and 31 are attracted to the magnets 45 along the entire length except the portions thereof passing through the piston yoke 22. The inner seal band 30 adheres to and seals the slit 3 by the pressure of the fluid in the cylinder chamber 6 and the attracting force of the magnets 45. The outer seal band 31 also adheres to and seals the slit 3 by the attracting force of the magnets 45.

Figure 4:
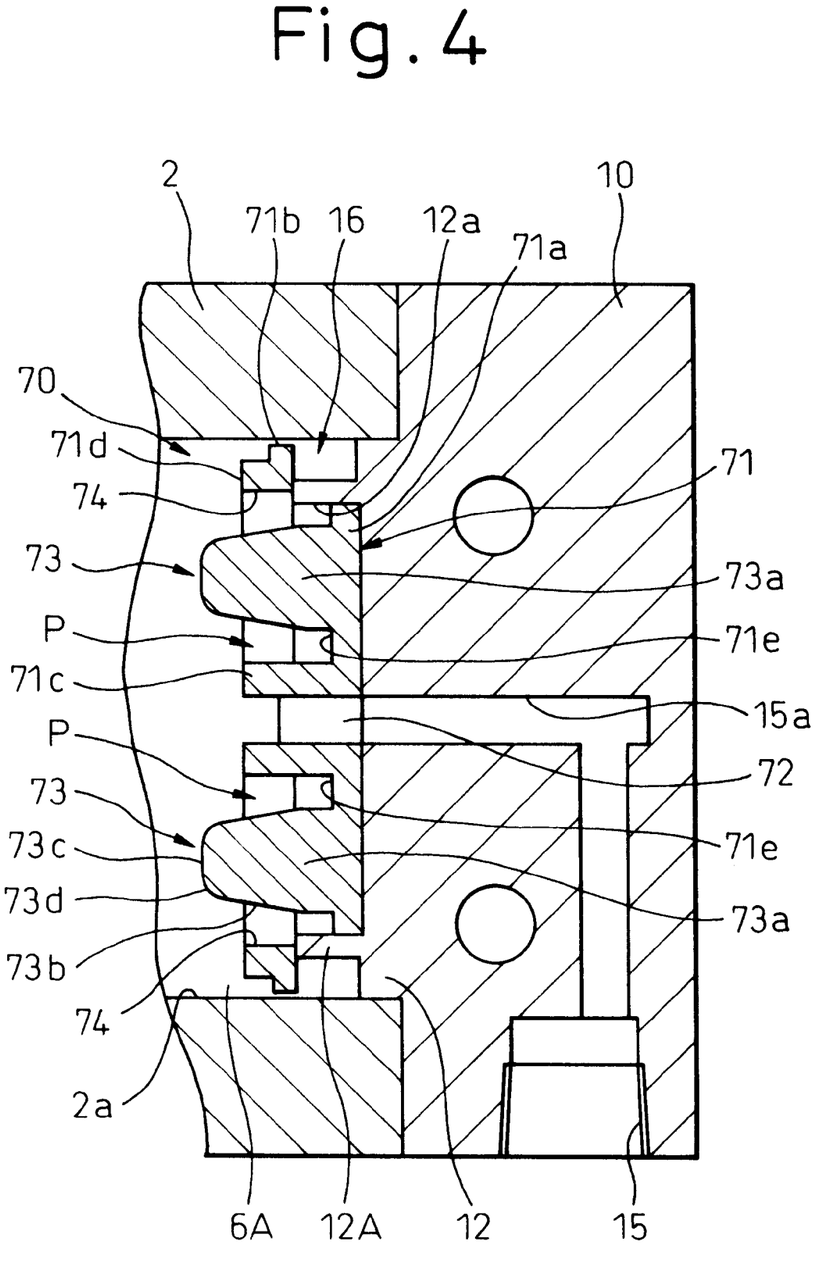
FIG. 4 is a partial sectional view taken along the line IV—IV in FIG. 1.
Figure 5:
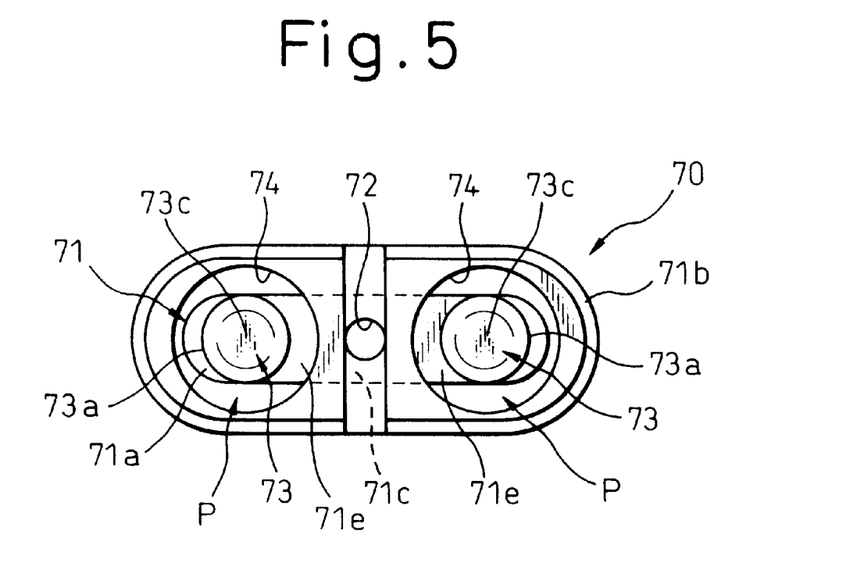
FIG. 5 is a front view of the elastomer damper in FIG. 1.

The cross section of the insert portion 12 of the end cap 10 is an oblong circular shape which matches the shape of the cross section of the cylinder bore 2a. Further, a reduced diameter portion 12A is formed on the end of the insert portion 12 as shown in FIG. 4. A fitting recess 12a of an oblong circular shape and having a predetermined depth is formed on the end face of the reduced diameter portion 12A.

An elastomer damper 70 is fixed to the insert portion 12 of the end cap 10. The elastomer damper 70 consists of a base portion 71 and two protruding portions 73, all integrally formed by an elastomer such as a nitrile rubber. An end (an outer end) 71a of the base portion 71 has an oblong circular shaped cross-section which fits to the shape of the recess 12a of the insert portion 12 of the end cap 10. The elastomer damper 70 is fixed to the end cap 10 by fitting the outer end 71a into the recess 12a and fixing it therein using an adhesive. The base portion 71 further includes a flange 71b formed on an end (an inner end) and having also an oblong circular outer shape slightly smaller than the cross section of the bore 2a. The flange 71b is connected to the outer end 71a by a land portion 71c formed on the outer end 71a at the center portion thereof. A fluid passage 72 for supplying and discharging a working fluid (in this embodiment, pressurized air) to and from the cylinder chamber 6 is formed in the land portion 71c. The fluid passage 72 has an aperture opening to the cylinder chamber 6 and is connected to a fluid port 15 (FIG. 3) of the end cap 10 via a passage 15a (FIG. 4) formed in the end cap 10. When the outer end 71a is inserted and fixed to the recess 12a, a groove 16 for receiving and holding the cylinder gasket (O-ring) 13 is formed between the flange 71b of the elastomer damper 70 and the inserting portion 12 of the end cap 10 (FIG. 4).

A pair of protruding portions 73 are formed on both sides of the land portion 71c. Each protruding portion 73 has a generally circular cross section and is tapered in the direction toward the piston (i.e., in the left direction in FIG. 4) so that the cross sectional area thereof gradually decreases from the base 73a where the protruding portion 73 merges to the outer end 71a. The protruding portion extends towards the piston in the cylinder beyond the inner end face 71d of the base portion 71. The diameter of the base 73a matches the shorter diameter of the outer end 71a of the base portion 71. In the direction along the larger diameter of the outer end 71a, the protruding portions 73 are disposed in such a manner that a clearance is formed between the wall of the recess 12a and the outer periphery of the base 73a.

The top face 73c of the protruding portion 73 in this embodiment is formed as a flat plane, and this flat plane is connected to the tapered side face 73b of the protruding portion 73 by a round surface 73d. The protruding portions 73 extend through openings 74 (FIGS. 4 and 5) formed on the flange 71b. Grooves 71e are formed between the bases 73a of the protruding portions 73 and the land 71c. The groove 71e is shaped in such a manner that the outer radius of the groove 71e matches the radius of the opening 74 of the flange 71b. Thus, a clearance P (FIG. 5) for accommodating the radial expansion of the protruding portion 73 (the expansion in the direction perpendicular to the longitudinal axis of the protruding portion 73) when it is compressed is formed between the periphery of the protruding portion 73 and the land 71c, the inner wall of the opening 74 and the inner wall of the recess 12a. In this embodiment, since the diameter of the base 73a is the same as the smaller diameter of the outer end 71a, a large cross sectional area of the base 73a of the protruding portion 73 can be obtained.

In order to provide a large flexibility of the protruding portion 73, the elastomer damper in this embodiment is made from a material having a relatively low elastic modulus, such as a nitrile rubber having a shore hardness of about 80.

On the upper portion of the end cap 10, an external damper 80 is attached. The external damper 80 is disposed on the upper face of the cylinder tube 2 and abuts the fore end 23c (or the aft end 23d) of the external carriage 26 at its stroke end. The external damper also absorbs the kinetic energy of the external carriage 26 and the work placed thereon, in addition to the driving force of the piston 20 transmitted to the carriage 26.

Figure 3:
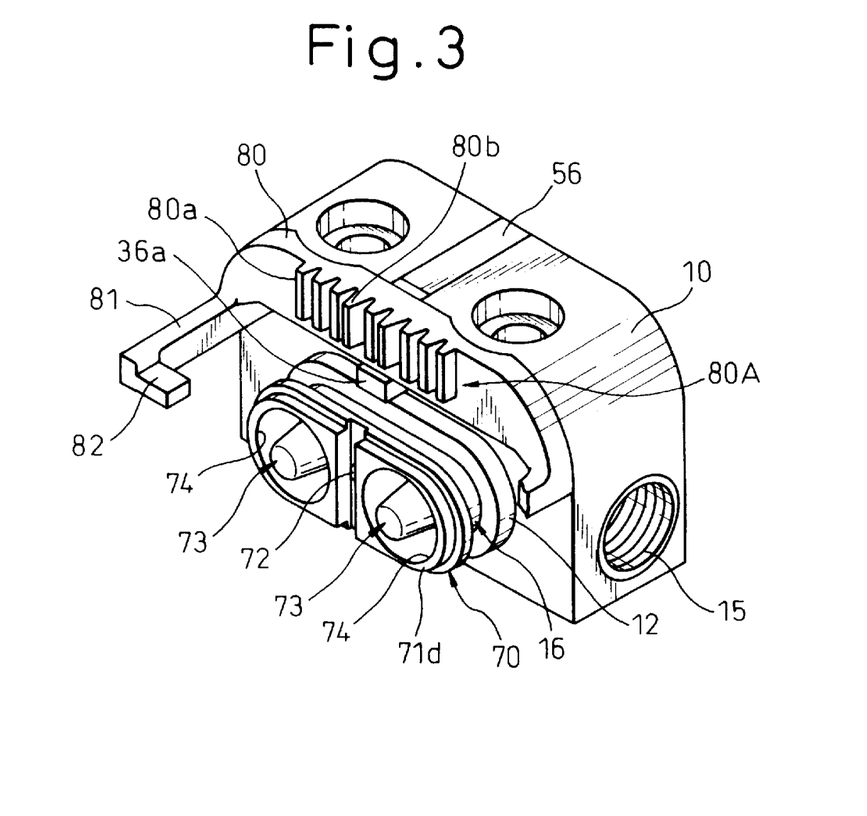
FIG. 3 is a perspective view of the elastomer damper attached to the end cap.

In this embodiment, the end face 80A for abutting the external carriage 26 is formed on the external damper 80. The end face 80A consists of a first group of protrusions 80b and a second group of protrusions 80a which has an amount of protrusion smaller than the first group of protrusions 80b (FIG. 3).

Further, as can be seen from FIG. 2, the external damper 80 is provided with lower end portions 81 extending along the grooves 4 of the cylinder tube 2. An insert member 82 is provided on each of the ends of the extended lower end portions 81. The damper 80 is attached to the tube 2 by inserting the insert members 82 into the grooves 4. In this condition, the self-tapping screws 14 on both sides of the tube 2 are covered by the lower end portions 81 of the dampers 80.

When the piston 20 moves to its stroke end, the protruding portions 73 of the rod-like elastomer damper 70 first contact the piston end 21. The protruding portions 73 deflect in the axial direction as the piston 20 further proceeds, i.e., the protruding portions 73 are compressed and expand in the radial direction. A part of the kinetic energy of the piston 20, the external carriage 26 and the work thereon is absorbed by the deflections of the protruding portions 73. The protruding portions 73 can easily expand in the radial direction due to a relatively large clearance P (FIGS. 4 and 5) provided around the protruding portions 73. Further, since the cross sectional areas of the protruding portions 73 gradually decrease from the bases 73a to the tips thereof, the braking force exerted on the piston from the protruding portions gradually increases as the piston 20 proceeds towards its stroke end. Therefore, the braking of the piston is performed smoothly without incurring a shock. Further, since the cross sectional area of the base 73a is larger than the cross sectional area of the tip portion, the protruding portion 73 is not bent easily in spite of its cantilever type construction. When the radial expansion of the protruding portion 73 becomes large, the side faces of the protruding portions 73 contact the inner wall of the recess 12a and the radial expansions of the protruding portion 73 are restricted. In this condition, the piston end 21 comes into contact with the inner end face 71d of the base portion 71.

The top faces 73c of the protruding portions 73 are connected to the side faces 73b by a round surface and no sharp ridge exists at the connecting portion between the top faces 73c and the side surfaces 73b. Therefore, cracking or breakage of the material of the protruding portions 73 due to the stress concentration does not occur even if the damper is used for a long time.

Near the time when the piston end 21 hits the inner end face 71d of the elastomer damper 70, the external carriage 26 contacts the external damper 80, and the remaining kinetic energy of the piston 20 and the external carriage 26 are absorbed by the external damper 80. If an internal elastomer damper 70 having a large shock absorbing capacity is used, the external damper 80 may be omitted.

Figure 6:
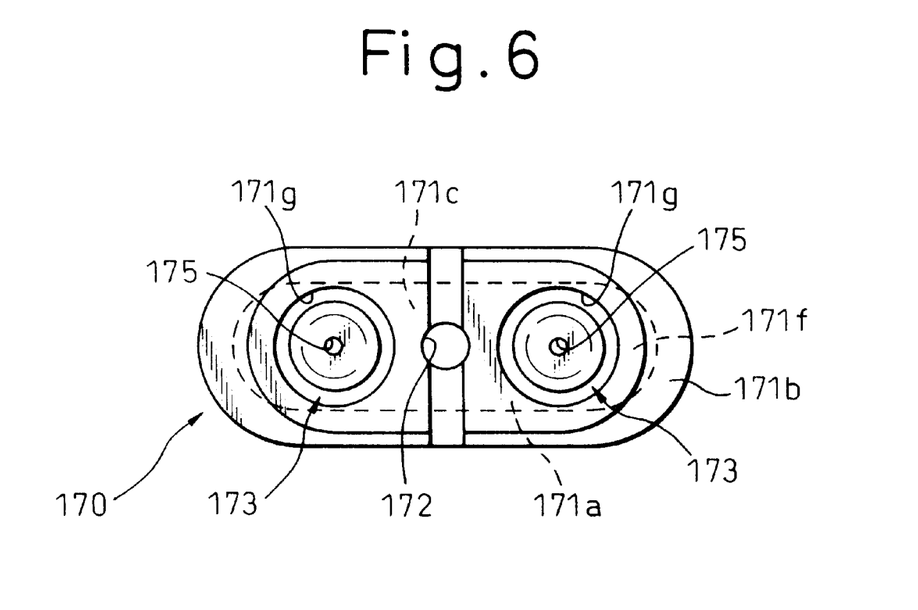
FIG. 6 is a front view of the elastomer damper according to another embodiment.
Figure 7:
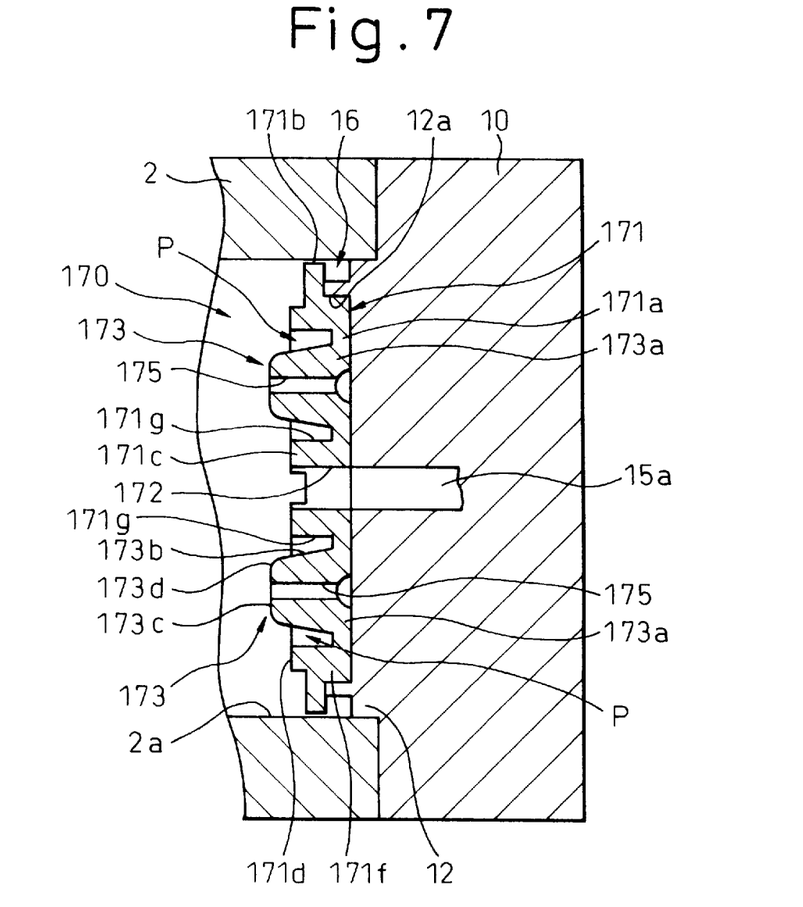
FIG. 7 is a partial sectional view similar to FIG. 4 which illustrates the elastomer damper in the embodiment in FIG. 6.

Next, another embodiment of the elastomer damper is explained with reference to FIGS. 6 and 7.

In this embodiment, the base portion 171 of the elastomer damper 170 also consists of the outer end 171a which fits to the recess 12a of the end cap 10, and a flange 171b. However, in this embodiment, a wall 171f is formed on the periphery of the outer end 171a, and the flange 171b is connected to the outer end 171a by both the land portion 171c between the protruding portion 173 and the wall 171f. Further, a recess or a hole 175 is formed on the center of the top face of each protruding portions 173. In this embodiment, the recess 175 is formed as a through hole extending along all the length of the protruding portions 173, however, the recess 175 does not need to extend along the length of the protruding portions 173. Annular grooves 171g which provide the clearance P in order to accommodate the radial expansion of the protruding portions are formed between the walls 171f and the peripheries of the protruding portions 173.

The protruding portions 173 have also tapered shapes in this embodiment, i.e., the cross sectional areas of the protruding portions 173 decrease from the bases 173a in the direction towards the top faces 173c of the protruding portions 173. Further, similarly to the previous embodiment, the flat plane surface of the top face 173c is also connected to the tapered side face of the protruding portion 173 by a round surface 173d in this embodiment. The fluid passage 172 is also formed in the land portion 171c between the protruding portions 173, and the groove 16 for holding the cylinder gasket 13 is formed between the flange 171b and the inserting portion 12 of the end cap 10.

In this embodiment, since the recess (the hole) 175 is formed in the protruding portion 173, the protruding portion 73 can expand in the inward radial direction as well as to the outward radial direction when it is compressed. Therefore, when the piston 20 hits the protruding portions 173, the protruding portions 173 can deflect in the axial direction more easily than in the previous embodiment in which solid protruding portions 73 are used. Thus, in this embodiment, a larger shock absorbing capability of the elastomer damper 70 is obtained.

Figure 8:
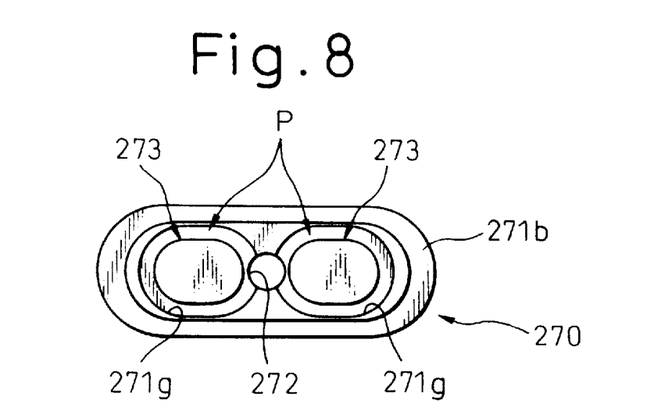
FIG. 8 is a front view of the elastomer damper according to another embodiment.
Figure 9:
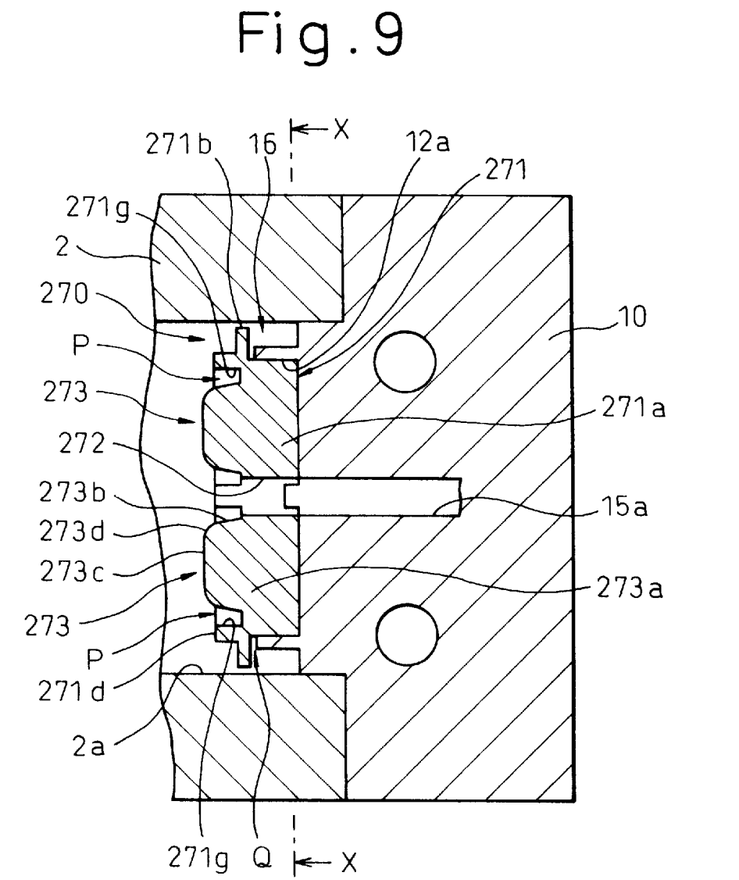
FIG. 9 is a partial sectional view similar to FIG. 4 which illustrates the elastomer damper in the embodiment in FIG. 8.

Next, another embodiment of the elastomer damper according to the present invention will be explained with reference to FIGS. 8 through 10. Similarly to the previous embodiments, a pair of the protruding portions 273 are provided on both sides of the fluid passage 272, and the clearance P is provided around the protruding portions 273 in order to accommodate the radial expansion of the protruding portions, and the flat plane surface of the top faces 273c of the protruding portions 273 are connected to the tapered side surfaces 273b by round surfaces 273d. However, the present embodiment is different from the previous embodiments in that the protruding portions 273 have elliptical (or oblong circular) cross sections and that a clearance R is provided between the wall of the recess 12a and the outer periphery of the outer end 271a of the elastomer damper 270 in the direction along the shorter diameter thereof. More specifically, as can be seen from FIG. 10, the outer end 271a of the base portion 271 in this embodiment consists of an oblong circular shape base 271A and projections 271B disposed on the periphery of the oblong circular base 271A. The larger diameter of the oblong circular base 271A is the same as the larger diameter of the recess 12a (refer to FIG. 9), but the shorter diameter of the oblong circular base 271A is slightly smaller than the shorter diameter of the recess 12a in this embodiment. Therefore, when the outer end 271a is inserted into the recess 12a of the end cap 10, the oblong circular base 271A directly contacts the wall of the recess 12a in the direction of the larger diameter thereof. However, in the smaller diameter direction, the projections 271B of the outer end 271a contacts the wall of the recess 12a and a clearance R is formed between the wall of the recess 12a and the outer periphery of the oblong circular base 271A. The outer end 271a is positioned in the recess 12a by the contact between the larger diameter portion of the oblong circular base 271A and the wall of the recess 12a and by the contact between the projection 271B and the wall of the recess 12a.

Further, in this embodiment, an axial clearance Q is provided between the flange 271b of the base portion 271 and the tip of the reduced diameter portion 12A of the end cap 10. Therefore, when the piston hits the protruding portions 273, the protruding portions 273 are compressed in the axial direction and, when the piston further abuts the end face 271d of the base portion 271, the base portion 271 is also compressed in the axial direction since the clearance Q allows the axial deflection of the base portion 271. Further, since the clearance R is provided between the oblong circular base 271A and the wall of the recess 12a, the oblong circular base 271A expands in the direction of the smaller diameter. Thus, the kinetic energy of the piston 20 is absorbed by the deflection of the base portion 271 as well as the deflection of the protruding portions 273.

According to the present embodiment, by allowing the axial deflection of the base portion 271, a sufficient shock absorbing capacity of the elastomer damper can be obtained even if the length of the protruding portions 273 is limited.

Though the clearance R around the outer end of the elastomer damper is not provided in the embodiments in FIGS. 3 through 7, it is needless to say that if the clearance R is provided in the embodiments in FIGS. 3 through 7, the shock absorbing capacity of the elastomer damper can be further increased.

Figure 10:
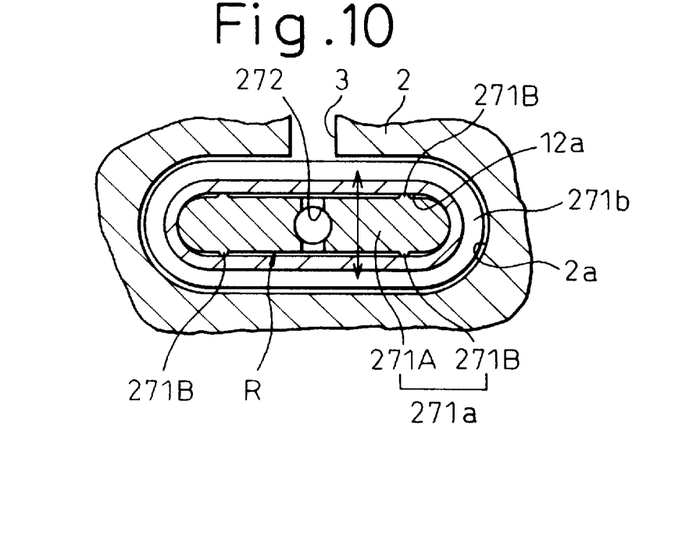
FIG. 10 is a sectional view taken along the line X—X in FIG. 9.

In the embodiment in FIG. 10, the projections 271B are provided in order to facilitate the positioning of the outer end 271a within the recess 12a of the end cap 10. However, if the outer end 271a can be positioned within the recess 271a by other method when fixing the outer end to the end cap 10 by adhesive, it is not necessary to form the projections 271B on the periphery of the oblong circular base 271A.

As explained above, according to the present invention, the cross sectional area of the protruding portion continuously decreases from the base to the top thereof. Therefore, when the piston abuts the protruding portion, the braking force exerting the piston gradually increases and the piston decelerates continuously without incurring a mechanical shock. Further, since the cross sectional area of the protruding portion is relatively large, the protruding portion does not bend easily in spite of its cantilever construction.

Further, according to the present invention, the top surface of the protruding portion is connected to the tapered side surface by a round surface, i.e., no sharp ridge is formed around the top surface. Therefore, a crack or break in the material of the protruding portion due to the stress concentration does not occur even in the long time operation.

Further, if a recess or a through hole is provided in the center of the protruding portion, the protruding portion can expand in the inward radial direction as well as the outward radial direction. This increases the amount of axial deflection when the protruding portion is compressed by the piston and further increases the shock absorbing capacity of the elastomer damper.

According to the present invention, since the groove for holding the cylinder gasket is formed by the flange of the base portion of the elastomer damper and the end cap, i.e., no other element is required for forming the groove for the cylinder gasket, the construction of the elastomer damper can be simplified.

Further, if the flange is connected to the outer end of the base of the elastomer damper only by the land portion formed on the outer end between the protruding portions, since no other walls are required around the protruding portions, a large clearance around the peripheries of the protruding portions can be provided in order to accommodate the radial expansions of the protruding portions.

Further, when the radial expansion of the base portion, in addition to the radial expansion of the protruding portion, is allowed, a large shock absorbing capacity can be achieved with the protruding portions having shorter lengths.

What is claimed is:

1. An elastomer damper for receiving a piston sliding in a cylinder of an actuator cylinder at the stroke end thereof comprising:
   a base portion fixed to an end cap to be attached to an end of the cylinder, the base portion being disposed in the cylinder and having an outer end attached to the end cap and an inner end facing the piston in the cylinder and extending from the outer end;
   at least one protruding portion projecting from the base portion beyond the inner end in the direction toward the piston in the cylinder;
   wherein the protruding portion has a tapered shape such that a cross sectional area perpendicular to the longitudinal axis thereof gradually decreases in the direction toward the piston from a portion where it merges with the outer end of the base portion and wherein the protruding portion is disposed in the cylinder in such a manner that a clearance is provided around and between the periphery of the protruding portion and the inner end of the base portion in order to allow the protruding portion to expand in the direction perpendicular to the longitudinal axis thereof when the piston abuts the protruding portion at the stroke end.

2. An elastomer damper as set forth in claim 1, wherein an end surface of the protruding portion facing the piston is formed as a flat plane, and the end surface and a side surface of the protruding portion are connected by a round surface.

3. An elastomer damper as set forth in claim 1, comprising a plurality of the protruding portions.

4. An elastomer damper as set forth in claim 3, wherein a pair of the protruding portions are disposed on both sides of a fluid passage piercing through the base portion for supplying and discharging fluid to and from the bore of the cylinder.

5. An elastomer damper as set forth in claim 1, wherein the shape of the cross section of the protruding portion perpendicular to the longitudinal axis thereof is one of a circle, an ellipse and an oblong circle.

6. An elastomer damper as set forth in claim 2, wherein the cross section of the protruding portion perpendicular to the longitudinal axis thereof is shaped as a circle, an ellipse or an oblong circle.

7. An elastomer damper as set forth in claim 3, wherein the shape of the cross section of the protruding portion perpendicular to the longitudinal axis thereof is one of a circle, an ellipse and an oblong circle.

8. An elastomer damper as set forth in claim 1, wherein a hole extending along the longitudinal axis is formed on the top surface of the protruding portion.

9. An elastomer damper as set forth in claim 2, wherein a hole extends along the longitudinal axis of and opens through the end surface of the protruding portion.

10. An elastomer damper as set forth in claim 3, wherein a hole extends along the longitudinal axis of and opens through the end surface of the protruding portion.

11. An elastomer damper as set forth in claim 1, wherein the end cap comprises an inserting portion extending into the bore of the cylinder when the end cap is attached thereto and defining at an end therof, a recess for receiving the outer end of the base portion of the elastomer damper when the damper is attached to the end cap, and wherein the base portion of the elastomer damper further comprises a flange portion disposed in such a manner that a receiving groove is formed between the flange portion and the inserting portion of the end cap for receiving a cylinder gasket for preventing the fluid in the bore of the cylinder from leaking to the outside of the cylinder.

12. An elastomer damper as set forth in claim 11, wherein a clearance is provided between the outer periphery of the outer end of the base portion and the inner periphery of the recess of the inserting portion in order to allow the base portion to expand when the piston abuts the protruding portion.

13. An elastomer damper for receiving a piston sliding in a cylinder of an actuator cylinder at the stroke end thereof comprising:
   a base portion fixed to an end cap attached to an end of the cylinder, the end cap including an inserting portion extending into the bore of the cylinder when the end cap is attached thereto and defining at an end thereof, a recess for receiving an outer end of the base portion of the elastomer damper when the damper is attached to the end cap; and a plurality of protruding portions projecting from the outer end of the base portion in the direction toward the piston in the cylinder, the protruding portions having tapered shapes such that cross sectional areas perpendicular to the longitudinal axes thereof gradually decrease in the direction from the outer end of the base portion toward the piston;

wherein the base portion comprises a flange portion formed generally perpendicular to the longitudinal axes of the protruding portions and being connected to the outer end by a connecting portion formed on the outer end between the protruding portions, the flange portion being disposed in such a manner that a receiving groove is formed between the flange portion and the inserting portion of the end cap for receiving a cylinder gasket for preventing the fluid in the bore of the cylinder from leaking to the outside of the cylinders and wherein the protruding portions extend in the direction toward the piston through apertures formed on the flange portion.

* * * * *